(12) United States Patent
Gekonde

(10) Patent No.: US 9,316,313 B2
(45) Date of Patent: Apr. 19, 2016

(54) HIGH MODULUS WEAR RESISTANT GRAY CAST IRON FOR PISTON RING APPLICATIONS

(71) Applicant: FEDERAL-MOGUL CORPORATION, Southfield, MI (US)

(72) Inventor: Haron Ogega Gekonde, West Bloomfield, MI (US)

(73) Assignee: Federal-Mogul Corporation, Southfield, MI (US)

(*) Notice: Subject to any disclaimer, the term of this patent is extended or adjusted under 35 U.S.C. 154(b) by 0 days.

(21) Appl. No.: 14/741,678

(22) Filed: Jun. 17, 2015

(65) Prior Publication Data
US 2015/0285378 A1 Oct. 8, 2015

Related U.S. Application Data

(62) Division of application No. 13/688,802, filed on Nov. 29, 2012, now Pat. No. 9,091,345.

(60) Provisional application No. 61/565,040, filed on Nov. 30, 2011.

(51) Int. Cl.
| | | |
|---|---|---|
| *C22C 37/10* | (2006.01) | |
| *F16J 9/26* | (2006.01) | |
| *B22D 25/06* | (2006.01) | |
| *C21D 5/00* | (2006.01) | |
| *C21D 5/02* | (2006.01) | |
| *C22C 33/08* | (2006.01) | |
| *C21D 9/00* | (2006.01) | |
| *C22C 37/06* | (2006.01) | |
| *C22C 37/08* | (2006.01) | |

(52) U.S. Cl.
CPC . *F16J 9/26* (2013.01); *B22D 25/06* (2013.01); *C21D 5/00* (2013.01); *C21D 5/02* (2013.01); *C21D 9/0068* (2013.01); *C22C 33/08* (2013.01); *C22C 37/06* (2013.01); *C22C 37/08* (2013.01); *C22C 37/10* (2013.01)

(58) Field of Classification Search
CPC ........... F16J 9/26; B23P 15/06; B23P 15/065; C21D 5/00; C21D 5/02; C21D 9/0068; C22C 37/06; C22C 37/08; C22C 37/10; C22C 33/08
See application file for complete search history.

(56) References Cited

U.S. PATENT DOCUMENTS

| | | | | |
|---|---|---|---|---|
| 4,435,226 A * | 3/1984 | Neuhauser et al. | ........... | 148/545 |
| 4,681,326 A * | 7/1987 | Kubo | ............... | 277/447 |
| 7,083,685 B1 * | 8/2006 | Katori et al. | ................... | 148/321 |
| 8,506,727 B2 * | 8/2013 | Pelsoeczy | .................... | 148/221 |

FOREIGN PATENT DOCUMENTS

WO  WO 2010097105 A1 * 9/2010

* cited by examiner

*Primary Examiner* — Gilbert Lee
(74) *Attorney, Agent, or Firm* — Robert L. Stearns; Dickinson Wright, PLLC

(57) ABSTRACT

A piston ring formed of cast iron provides improved machinability and exceptional performance and minimum costs. The cast iron includes 2.2 to 2.9 wt. % carbon, 3.2 to 4.2 wt. % silicon, 0.75 to 1.25 wt. % copper, 1.0 to 1.5 wt. % manganese, 0.09 to 0.15 wt. % sulfur, not greater than 0.2 wt. % phosphorous, and an average carbon equivalent of 3.8. The cast iron preferably includes a matrix of martensite with MnS and carbides dispersed therein. The matrix is also preferably free of ferrite, austenite, and steadite. The cast iron is formed by casting, austenitizing, quenching, and tempering the alloy.

16 Claims, 1 Drawing Sheet

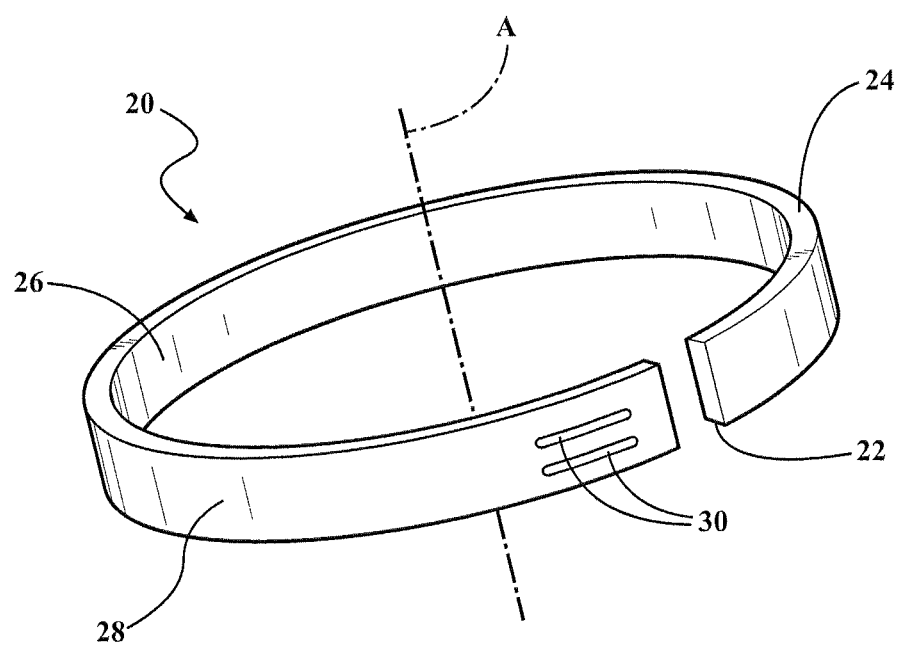

HIGH MODULUS WEAR RESISTANT GRAY CAST IRON FOR PISTON RING APPLICATIONS

This divisional application claims priority to U.S. Utility application Ser. No. 13/688,802, filed Nov. 29, 2012 and U.S. Provisional Application Ser. No. 61/565,040, filed Nov. 30, 2011, both of which are incorporated herein by reference.

BACKGROUND OF THE INVENTION

1. Field of the Invention

This invention relates generally to piston rings for internal combustion engines, materials thereof, and methods of forming the same.

2. Description of the Prior Art

Piston rings of internal combustion engine applications are often formed of cast iron compositions providing wear resistance and seizure resistance. U.S. Pat. No. 5,972,128 to Miwa discloses cast iron compositions used to form piston rings. The cast irons disclosed in Miwa include, in wt. % of the cast iron, 3.15 to 3.16 wt. % carbon, 2.66-2.86 wt. % silicon, 0.65 to 1.18 wt. % copper, 0.7 to 0.78 wt. % manganese, 0.04 to 0.06 wt. % sulfur, and 0.10 to 0.12 wt. % phosphorous. U.S. Pat. No. 4,891,076 and U.S. Pat. No. 5,985,052 also disclose example cast iron compositions.

One type of cast iron is referred to as gray cast iron, or gray iron. There are various grades of gray iron, and a typical gray iron composition includes, in weight percent (wt. %) of the gray iron, 2.0 to 4.0 wt. % carbon, 1.25 to 3.25 wt. % silicon, 0.75 to 1.25 wt. % manganese, 0.08 to 0.12 wt. % sulfur, and 0.07 to 0.2 wt. % phosphorous, based on the total weight of the gray iron.

Recently, there has been increased demand for piston rings including complex physical features, such as advanced oil groove designs, to provide increased performance and reduce costs. However, the cast irons of the prior art are oftentimes difficult to machine, or require expensive alloying additions to achieve the desired physical properties, which limits their use in piston rings of internal combustion engine applications.

SUMMARY OF THE INVENTION

One aspect of the invention provides a cast iron including, in weight percent (wt. %) of the cast iron, 2.2 to 2.9 wt. % carbon, 3.2 to 4.2 wt. % silicon, 0.75 to 1.25 wt. % copper, 1.0 to 1.5 wt. % manganese, 0.09 to 0.15 wt. % sulfur, and not greater than 0.2 wt. % phosphorous. A piston ring formed of the cast iron is also provided.

Yet another aspect of the invention provides a method of manufacturing a piston ring formed of cast iron. The method includes providing an alloy including, in wt. % of the alloy, 2.2 to 2.9 wt. % carbon, 3.2 to 4.2 wt. % silicon, 0.75 to 1.25 wt. % copper, 1.0 to 1.5 wt. % manganese, 0.09 to 0.15 wt. % sulfur, and not greater than 0.1 wt. % phosphorous. The method then includes casting the alloy, austenitizing the alloy, quenching the austenitized alloy, and tempering the alloy. Another aspect of the invention provides a method of forming the cast iron.

The cast iron provides improved machinability, especially when used to form piston rings with complex design features, such as advanced oil groove designs. The cast iron also provides exceptional bending strength, hardness, wear resistance, and elastic modulus. Further, the cast iron and piston ring formed of the cast iron are produced at low material and processing costs, compared to other methods used to form cast iron and piston rings.

BRIEF DESCRIPTION OF THE DRAWINGS

Other advantages of the present invention will be readily appreciated, as the same becomes better understood by reference to the following detailed description when considered in connection with the accompanying drawing wherein:

FIG. 1 is a perspective view of a piston ring according to one embodiment of the invention.

DETAILED DESCRIPTION

One aspect of the invention provides an improved cast iron and a piston ring 20 formed of the cast iron, as generally shown in FIG. 1. The cast iron provides improved machinability, so that complex physical features can be formed in the cast iron, such as advanced groove designs. The cast iron also provides exceptional bending strength, hardness, wear resistance, and elastic modulus, at a minimum production cost. The cast iron is formed by casting, austenitizing, quenching, and tempering an alloy including specified amounts of carbon, silicon, copper, manganese, sulfur, and phosphorous. The resulting cast iron comprises a matrix having a microstructure including at least one of martensite and bainite. The cast iron also includes manganese sulfide (MnS) and carbides dispersed throughout the matrix.

As shown in FIG. 1, piston ring 20 formed of the cast iron includes a bottom surface 22 and an oppositely facing top surface 24 extending parallel to one another and circumferentially around a center axis A. The piston ring 20 also presents an inner diameter surface 26 facing toward the center axis A and an oppositely facing outer diameter surface 28 each extending longitudinally from the bottom surface 22 to the top surface 24. The outer diameter surface 28 and the inner diameter surface 26 are typically parallel to one another and extend circumferentially around the center axis A. During use of the piston ring 20 in an engine application, the outer diameter surface 28 contacts an inner surface of a cylinder wall and provides a gas-tight seal therebetween. The piston ring 20 can include various design features formed therein, such as a plurality of oil grooves 30 along one or more of the surfaces 22, 24, 26, 28. The piston ring 20 can include other surface modifications or designs, which depend on the application of the piston ring 20. The piston ring 20 can accommodate all surface modifications or designs common to piston ring manufacturing.

The cast iron of the piston ring 20 includes specified amounts of carbon, silicon, copper, manganese, sulfur, and phosphorous, to provide the improved machinability and desirable physical properties. In one embodiment, the cast iron includes carbon in an amount sufficient to provide a carbon equivalent of 3.4 to 4.2, which is the carbon equivalent below the eutectic temperature of the cast iron, referred to as the average carbon equivalent hypoeutectic. The eutectic temperature of the cast iron is typically 1145 to 1155° F. In one embodiment, the cast iron has an average carbon equivalent hypoeutectic of 3.8.

To provide the preferred carbon equivalent range of 3.4 to 4.2, the cast iron typically includes, in weight percent (wt. %) of the cast iron, 2.2 to 2.9 wt. % carbon, or 2.4 to 2.8 wt. % carbon, based on the total weight of the cast iron. In another embodiment, the cast iron includes at least 2.2 wt. % carbon, or not greater than 2.9 wt. % carbon.

In one embodiment, the cast iron includes 3.2 to 4.2 wt. % silicon, or 3.4 to 3.8 wt. % silicon. In another embodiment, the cast iron includes at least 3.2 wt. % silicon, or not greater than 4.2 wt. % silicon.

In one embodiment, the cast iron includes 0.75 to 1.25 wt. % copper, or 0.8 to 1.0 wt. % copper. In another embodiment, the cast iron includes at least 0.75 wt. % copper, or not greater than 1.25 wt. % copper.

In one embodiment, the cast iron includes 1.0 to 1.5 wt. % manganese, or 1.1 to 1.3 wt. % manganese. In another embodiment, the cast iron includes at least 1.0 wt. % manganese, or not greater than 1.5 wt. % manganese.

In one embodiment, the cast iron includes 0.09 to 0.15 wt. % sulfur, or 0.10 to 0.12 wt. % sulfur. In another embodiment, the cast iron includes at least 0.09 wt. % sulfur, or not greater than 0.15 wt. % sulfur.

In one embodiment, the cast iron includes not greater than 0.2 wt. % phosphorous, or 0.07 to 0.09 wt. % phosphorous. In another embodiment, the cast iron includes at least 0.01 wt. % phosphorous or not greater than 0.09 wt. % phosphorous.

The cast iron preferably includes chromium, vanadium, niobium, tungsten, and boron in amounts contributing to the exceptional wear resistance. In one embodiment, the cast iron includes 0.25 to 0.65 wt. % chromium, or 0.3 to 0.55 wt. % chromium. In another embodiment, the cast iron includes at least 0.25 wt. % chromium, or not greater than 0.65 wt. % chromium. In one embodiment, the cast iron includes not greater than 0.2 wt. % vanadium, or not greater than 0.17 wt. % vanadium. In another embodiment, the cast iron includes at least 0.01 wt. % vanadium. In one embodiment, the cast iron includes not greater than 0.2 wt. % niobium, or not greater than 0.15 wt. % niobium. In another embodiment, the cast iron includes at least 0.01 wt. % niobium. In one embodiment, the cast iron includes not greater than 0.5 wt. % tungsten, or not greater than 0.45 wt. % tungsten. In another embodiment, the cast iron includes at least 0.01 wt. % tungsten. In one embodiment, the cast iron includes not greater than 0.1 wt. % boron, or not greater than 0.08 wt. % boron. In another embodiment, the cast iron includes at least 0.01 wt. % boron.

The cast iron preferably includes molybdenum and nickel in an amounts contributing to the exceptional bending strength and hardness. In one embodiment, the cast iron includes 0.3 to 0.5 wt. % molybdenum, or 0.34 to 0.39 wt. % molybdenum. In another embodiment, the cast iron includes at least 0.3 wt. % molybdenum, or not greater than 0.5 wt. % molybdenum. In another embodiment, the cast iron includes not greater than 0.22 wt. % nickel, or 0.10 to 0.25 wt. % nickel. In yet another embodiment, the cast iron includes at least 0.10 wt. % nickel, or not greater than 0.25 wt. % nickel.

The cast iron also preferably includes titanium in an amount contributing to the exceptional physical properties. In one embodiment, the cast iron includes 0.03 to 0.09 wt. % titanium, or 0.04 to 0.08 wt. % titanium. In another embodiment, the cast iron includes at least 0.03 wt. % titanium, or not greater than 0.09 wt. % titanium.

The remainder of the cast iron composition preferably consists essentially of iron, and in an amount sufficient to provide the matrix including at least one of martensite and bainite. In one embodiment, the cast iron includes at least 75.0 wt. % iron, or at least 85.0 wt. % iron. Although the remainder of the cast iron preferably consists of iron, the cast iron may also include impurities, preferably in an amount not greater than 1.0 wt. %, based on the total weight of the cast iron.

The matrix of the cast iron includes a microstructure comprising at least one of martensite and bainite, and preferably martensite. In one embodiment, the matrix includes, in volume percent (vol. %) of the matrix, 80 to 90 vol. % martensite, based on the total volume of the matrix.

Preferably, the cast iron includes a fine distribution of carbides dispersed throughout the matrix. The fine distribution of carbides contributes to the exceptional wear resistance provided by the cast iron. The amounts of chromium, vanadium, niobium, tungsten, and boron contribute to the amount of carbides formed in the matrix. The cast iron also includes manganese sulfide (MnS) dispersed throughout the matrix, which contributes to the improved machinability of the cast iron. The amounts of manganese and sulfur contribute to the amount of MnS in the cast iron. In one embodiment, the cast iron includes 0.5 to 1.5 vol. % Mn, based on the total volume of the cast iron.

The matrix of the cast iron is preferably free of ferrite, austenite, and steadite. Preferably, the total amount of ferrite, austenite, and steadite combined together is not greater than 5 vol. %, based on the total volume of the matrix. The low amounts of ferrite, austenite, and steadite, and high amounts of martensite and bainite contributes to the improved machinability and exceptional physical properties of the cast iron.

The improvement in machinability of the cast iron allows for formation of the piston ring 20 with a variety of different designs along the surfaces 22, 24, 26, 28 thereof. In one embodiment, the surfaces 22, 24, 26, 28 of the piston ring 20 include at least one oil groove 30, protrusion, or other type of recesses, contour, or surface modification.

In addition to providing improved machinability, the cast iron provides exceptional bending strength, hardness, and elastic modulus. In one embodiment, the cast iron has a bending strength of 750 to 1000 MPa, and typically 780 to 850 MPa. The cast iron also typically has a Brinell Hardness Number of 330 to 360 BHN, and a Rockwell Hardness B Scale value of 100 to 116 HRB, typically 108 to 112 HRB. In one embodiment, the cast iron has an elastic modulus of 115 to 160 GPa, typically 120 to 140 GPa. The cast iron also provides improved wear resistance. In one embodiment, the cast iron provides not greater than 70 microns of wear, typically not greater than 40 microns of wear, when tested using a Cameron-Plint Model TE-77 Reciprocating Sliding Wear Tester, according to ASTM Standard G-133.

Another aspect of the invention provides a method of forming the improved cast iron and manufacturing the piston ring 20 formed of the cast iron. The method of forming the cast iron and piston ring 20 is economical and can be conducted at lower material and process costs, compared to other methods used to provide cast irons and piston rings.

The method first includes providing an iron alloy comprising, in weight percent (wt. %) of the alloy: 2.2 to 2.9 wt. % carbon, or 2.4 to 2.8 wt. % carbon; 3.2 to 4.2 wt. % silicon, or 3.4 to 3.8 wt. % silicon; 0.75 to 1.25 wt. % copper, or 0.8 to 1.0 wt. % copper; 1.0 to 1.5 wt. % manganese, or 1.1 to 1.3 wt. % manganese; 0.09 to 0.15 wt. % sulfur, or 0.10 to 0.12 wt. % sulfur; 0.25 to 0.65 wt. % chromium, or 0.3 to 0.55 wt. % chromium; 0.3 to 0.5 wt. % molybdenum, or 0.34 to 0.39 wt. % molybdenum; 0.03 to 0.09 wt. % titanium, or 0.04 to 0.08 wt. % titanium; not greater than 0.2 wt. % niobium, or not greater than 0.15 wt. % niobium; not greater than 0.5 wt. % tungsten, or not greater than 0.45 wt. % tungsten; not greater than 0.1 wt. % boron, or not greater than 0.08 wt. % boron; not greater than 0.2 wt. % vanadium, or not greater than 0.17 wt. % vanadium; not greater than 0.1 wt. % phosphorous, or 0.07 to 0.09 wt. % phosphorous; not greater than 0.25 wt. % nickel, or 0.10 to 0.25 wt. % nickel; and at least 75.0 wt. % iron, or at least 85.0 wt. % iron.

The method next includes melting the alloy and casting the alloy in a mold to provide a desired shape. In one embodiment, the mold provides the shape of the piston ring 20 having the top surface 24, bottom surface 22, inner diameter surface 26, and outer diameter surface 28.

Next, the method includes austenitizing the cast alloy by heating the cast alloy to a temperature of 1750 to 1875° F. for 60 to 120 minutes. Next, the method includes quenching the austenitized alloy in oil at a temperature of 140 to 150° F. The method further includes tempering the alloy after the quenching step at a temperature of 950 to 1150° F. for 60 to 120 minutes to provide the finished cast iron.

Experiment

Performance tests were conducted for two cast irons formed according to embodiments of the invention. The compositions of the two inventive example cast irons, in wt. % of the cast iron, are disclosed in Table 1, as Examples 1 and 2. The inventive examples were compared to a conventional gray cast iron. The composition of the comparative gray cast iron is also disclosed in Table 1.

TABLE 1

|    | Inventive Example 1 | Inventive Example 2 | Comparative Example |
|----|---------------------|---------------------|---------------------|
| C  | 2.68                | 2.67                | 3.38                |
| Si | 4.11                | 3.87                | 2.5                 |
| Cu | 0.91                | 0.89                | 0.5                 |
| Mn | 1.26                | 1.2                 | 0.55                |
| Cr | 0.38                | 0.52                | 0.23                |
| V  | 0.03                | 0.16                | 0.05                |
| Nb | 0.01                | 0.11                | 0                   |
| B  | 0                   | 0                   | 0                   |
| W  | 0.01                | 0.26                | 0                   |
| P  | 0.01                | 0.01                | 0.4                 |
| Ni | 0.18                | 0.17                | 0                   |
| S  | 0.11                | 0.1                 | 0.11                |
| Mo | 0.38                | 0.38                | 0                   |
| Ti | 0.05                | 0.05                | 0                   |
| Fe | remainder           | remainder           | remainder           |

The inventive and comparative cast irons were then tested for hardness, elastic modulus, bending strength, and wear resistance. The hardness of each cast iron was tested according to ASTM E18-086; Standard Method for Rockwell hardness of metallic materials. The hardness test results are shown in Table 2 and illustrate the inventive cast irons have a greater hardness than the conventional gray cast iron.

TABLE 2

| Hardness (HRB) | | |
|---|---|---|
| Inventive Example 1 | Inventive Example 2 | Comparative Example |
| 109.8 | 109.9 | 101.7 |

The inventive and comparative cast irons were next tested for elastic modulus according to Federal-Mogul's Material Speciation for Piston Rings, Designation GEO 504, found in the Federal-Mogul Piston Ring Handbook, available at http://www.federalmogul.com/korihandbook/en/index.htm. The elastic modulus test results are shown in Table 3 and illustrate the inventive cast irons have a greater elastic modulus than the conventional gray cast iron.

TABLE 3

| Elastic Modulus (GPa) | | |
|---|---|---|
| Inventive Example 1 | Inventive Example 2 | Comparative Example |
| 122 | 131 | 102 |

The inventive and comparative cast irons were next tested for bending strength according to Federal-Mogul's Material Speciation for Piston Rings, Designation GEO 504, found in the Federal-Mogul Piston Ring Handbook, available at http://www.federalmogul.com/korihandbook/en/index.htm. The bending strength test results are shown in Table 4 and illustrate the inventive cast irons have a greater bending strength than the conventional gray cast iron.

TABLE 4

| Bending Strength (MPa) | | |
|---|---|---|
| Inventive Example 1 | Inventive Example 2 | Comparative Example |
| 790 | 850 | 540 |

The inventive and comparative cast irons were next tested for wear resistance using a Cameron-Plint Model TE-77 Reciprocating Sliding Wear Tester, according to ASTM Standard G-133. The wear test results are shown in Table 5 and illustrate the inventive cast irons experiences less wear than the conventional gray cast iron.

TABLE 5

| Wear (μm) | | |
|---|---|---|
| Inventive Example 1 | Inventive Example 2 | Comparative Example |
| 35 | 18 | 112 |

The inventive cast irons also provide advantages over other cast irons of the prior art, such as those of U.S. Pat. Nos. 5,985,052; 5,972,128; and 4,891,076.

The cast iron of the '052 patent includes a matrix of acicular ferrite in stable austenite with a mixture of non-broken, non-continuous steadite, unlike the matrix of the inventive cast irons. The '052 patent material also includes higher levels of phosphorous, which contributes to the high contents of steadite. The un-refined steadite of the '052 patent cast iron leads to difficult machining, unlike the inventive cast irons which provide exceptional machinability. The cast iron formed according to the '052 patent has a hardness of 280 to 330 BHN, which is lower than the hardness of the inventive cast irons. Further, in the cast iron of the '052 patent is used to form a piston ring, the decomposition of the austenite of the matrix during heating may revert the matrix to a brittle martensite phase or softer phase during service of the piston ring in an internal combustion engine application. Further, the cast iron of the '052 patent is achieved by austempering, unlike the method of the present invention.

The cast iron of the '128 patent provides wear resistance using expensive alloys, and is more difficult to machine than the inventive cast iron. The hardness of the '128 patent material is 85 to 95 HRB, which is lower than the hardness of the invention cast irons. The cast iron of the '076 patent is also achieved by austempering and includes a matrix of ferrite and austenite, unlike the cast iron according to embodiments of the present invention, which comprises a matrix including at least one martensite or bainite with carbides and MnS dispersed throughout the matrix.

Obviously, many modifications and variations of the present invention are possible in light of the above teachings and may be practiced otherwise than as specifically described.

What is claimed is:

1. A method of manufacturing a piston ring formed of cast iron, comprising the steps of:
providing an alloy including, in weight percent (wt. %) of the alloy, 2.2 to 2.9 wt. % carbon, 3.2 to 4.2 wt. % silicon, 0.75 to 1.25 wt. % copper, 1.0 to 1.5 wt. % manganese, 0.09 to 0.15 wt. % sulfur, and not greater than 0.1 wt. % phosphorous; casting the alloy; austenitizing the alloy; quenching the austenitized alloy; and tempering the alloy to form cast iron, wherein the cast iron comprises manganese sulfide (MnS) and carbides.

2. The method of claim 1 wherein the austenitizing step includes heating the alloy to a temperature of 1750 to 1850° F. for 60 to 120 minutes.

3. The method of claim 1 wherein the quenching step includes disposing the austenitized alloy in oil at 140 to 150° F.

4. The method of claim 1 wherein the tempering step includes heating the quenched alloy to a temperature of 950 to 1000° F. for 60 to 120 minutes.

5. The method of claim 1 wherein the alloy includes, in weight percent (wt. %) of the alloy, 2.5 to 2.9 wt. % carbon, 3.6 to 4.2 wt. % silicon, 0.75 to 1.25 wt. % copper, 1.0 to 1.5 wt. % manganese, and 0.09 to 0.15 wt. % sulfur.

6. The method of claim 1 including forming an oil grove in the cast iron.

7. The method of claim 1, wherein the cast iron comprises a matrix including at least one of martensite and bainite, and the manganese sulfide (MnS) and carbides are dispersed throughout the matrix.

8. The method of claim 7, wherein the cast iron includes, in vol. % of the cast iron, the MnS in an amount of 0.5 to 1.5 vol. %, based on the total volume of the cast iron.

9. The method of claim 7, wherein the matrix includes, in vol. % of the matrix, the martensite in an amount of 80 to 90 vol. %, based on the total volume of the matrix.

10. The method of claim 7, wherein the matrix includes, in vol. % of the matrix, not greater than 5 vol. % ferrite, austenite, and steadite, based on the total volume of the matrix.

11. The method of claim 1, wherein the cast iron has an average carbon equivalent of 3.4 to 4.2.

12. The method of claim 11, wherein the cast iron has an average carbon equivalent of 3.8.

13. The method of claim 1, wherein the alloy includes, in wt. % of the alloy, 0.3 to 0.5 wt. % molybdenum.

14. The method of claim 1, wherein the alloy includes, in wt. % of the alloy, nickel in an amount not greater than 0.22 wt. % nickel.

15. The method of claim 1, wherein the alloy includes, in wt. % of the alloy, 0.25 to 0.65 wt. % chromium.

16. A method of forming a cast iron, comprising the steps of:
providing an alloy including, in weight percent (wt. %) of the alloy, 2.2 to 2.9 wt. % carbon, 3.2 to 4.2 wt. % silicon, 0.75 to 1.25 wt. % copper, 1.0 to 1.5 wt. % manganese, 0.09 to 0.15 wt. % sulfur, and not greater than 0.1 wt. % phosphorous; casting the alloy; austenitizing the alloy; quenching the austenitized alloy; and tempering the alloy to form cast iron, wherein the cast iron comprises manganese sulfide (MnS) and carbides.

* * * * *